Nov. 27, 1951          W. L. RAMSEY          2,576,640
COMBINED CLEAN-OUT AND FLOW CONTROL DEVICE FOR FLUID LINES
Filed Aug. 29, 1947
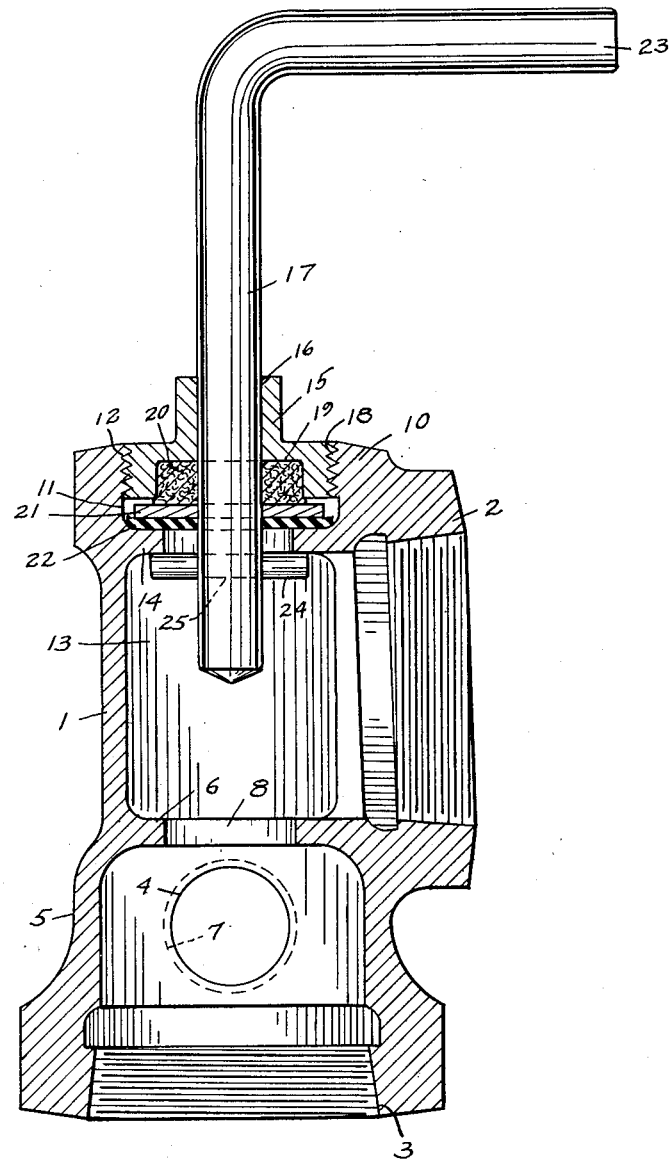
INVENTOR
Wellington L. Ramsey
BY
Florian G. Miller
ATTORNEY Patented Nov. 27, 1951

2,576,640

UNITED STATES PATENT OFFICE 2,576,640

COMBINED CLEAN-OUT AND FLOW CONTROL DEVICE FOR FLUID LINES

Wellington L. Ramsey, Erie, Pa., assignor to J. A. Zurn Manufacturing Company, Erie, Pa., a corporation of Pennsylvania Application August 29, 1947, Serial No. 771,313

1 Claim. (Cl. 4—255)

This invention relates generally to flow control devices and more particularly to means for maintaining flow control devices and other members in a pipe line clear of obstructions without interrupting the flow or drainage of fluid.

It is necessary in many installations to maintain the flow of fluid within certain limits, particularly where they are installed in a pipe line in conjunction with a separating or grease intercepting device rated to operate only within predetermined maximum flow rates. In drainage installations, much trouble has heretofore been encountered by stoppage from solids such as pieces of potato, peas, carrots, potato peelings and like food particles carried by the drainage fluid. These stoppages are quite frequent in installations where there is a reduced aperture in the line, such as a reduced aperture for controlling the flow of fluid. It has been necessary to interrupt the operation of the drainage system to dismantle the pipes and fittings of the installation to free the particular stoppage and where the system is provided with a clean-out plug at a particular point in the line or in a flow control fitting, it is still necessary to interrupt the flow of fluid and drain the system while the plug is removed. It is, furthermore, very difficult to clean and clear a fitting with a reduced aperture from one side thereof where the plug is removed in that much of the dirt and other solid matter is disposed on or forced to the opposite side of the apertured wall in the fitting and it is compressed and packed in many instances so as to require complete dismantlement of the installation. The reason for such stoppage due to the packing of the solids in the line is that there is no constant flow of fluid to wash the solid particles through the system as they are broken up and forced through the reduced aperture and through the line.

It is, accordingly, an object of my invention to overcome the above and other defects in flow control devices and it is more particularly an object of my invention to provide novel means for freeing stoppages in a drainage or other fluid system without interrupting the flow of fluid therethrough.

Another object of my invention is to provide a fluid control device with means for freeing stoppages therein, which is simple in construction, economical in cost, easily installed, economical in manufacture, and efficient in operation.

Another object of my invention is to provide a novel fitting adapted to be substituted for an elbow in a fluid line which has novel means for controlling the flow of fluid therethrough and further means for maintaining the fitting free of all obstructions without interrupting the flow of fluid through the fitting.

Another object of my invention is to provide a novel flow control device with novel vent means thereby permitting an apertured wall in the fitting to operate as a perfect thin plate orifice.

Another object of my invention is to provide novel packing gland devices for a fitting to maintain a perfect seal between a reciprocating cleanout plunger, the gland devices and a plug.

Other objects of my invention will become evident from the following detailed description, taken in conjunction with the accompanying drawings, in which the figure in the drawing is a vertical sectional view of my novel flow control fitting with cleanout means therefor.

Referring now to the drawings, the figure shows a fitting comprising a generally cylindrical shaped body portion 1 having a threaded portion 2 extending laterally thereof comprising an inlet to the fitting and a threaded portion 3 comprising an outlet from the fitting. It will be evident that the disposal of the inlet and outlet in different portions of the fitting may be varied without departing from my invention. A venting aperture 4 is disposed in the enlarged portion 5 of the body 1 between the outlet 3 and a transverse wall 6 disposed between the venting aperture 4 and the inlet aperture 2. The venting aperture 4 may be disposed on either side of the portion 5. The venting aperture 4 is threaded at 7 to receive a conventional pipe (not shown) for venting purposes. The wall 6 has a centrally disposed aperture 8 therein of predetermined size to control the flow of fluid through the fitting. The maximum rate of flow of fluid through the orifice 8 is determined by the head of the liquid above the fitting or the pressure thereof. By knowing the head, the size of the aperture 8 is determined for maximum flow of a particular quantity of fluid. By venting directly below the aperture 8 through the aperture 4, the operation simulates a perfect thin plate orifice. The upper portion 10 of the body 1 has a recess 11 internally threaded at 12 and separated from the chamber 13 of the body 1 by an apertured wall portion 14. A plug 15 having a central aperture 16 for receiving a plunger or rod 17, is externally threaded at 18 for threadably engaging the threaded portion 12 of the upper portion 10 of the body 1. The plug 15 has a counter bore 19 for receiving compressible sealing material 20. An apertured metal washer 21 and a comparatively thin flexible washer 22 are disposed between the sealing material 20 and the wall 14. The plug 15 holds the sealing members 20, 21, and 22, secure and tight around the plunger 17 to prevent leakage and still permit easy movement of the plunger 17. A transverse pin 24 is disposed in transverse aperture 25 in the bottom portion of the plunger 17 to prevent withdrawal of the rod 17 from the fitting 1.

In operation, my novel fitting may be connected in a drainage line in place of an elbow, the vertical distance of the fitting 1 from a sink which it is draining and the maximum flow rate allowed determining the size of the flow control aperture 8 in the body or fitting 1. The threaded portion 2 is connected to any suitable piping and the threaded portion 3 may be connected to a separator, a grease interceptor, or the like. I preferably provide a venting connection to the threaded venting aperture 4 to permit operation of my flow control device as a perfect thin plate orifice. When food particles or other solid matter plug up and stop up the flow control aperture 8, it is only necessary to push the plunger 17 downwardly wherein the solid matter is forced through the aperture 8 and out through the drainage system without interrupting the flow of fluid through the line. My novel flow control device may operate without a venting aperture but I prefer to use a venting aperture because of more efficient operation thereof without siphoning. In assembling the plunger 17 as shown in the figure of the drawing, a flexible washer 22 is disposed adjacent the wall 14, then a metal washer 21 is disposed on top of the flexible washer 22 and threaded plug 15 with counterbore 19 and sealing material 20, is engaged with the threaded portion 12 of the recess 11 of the flange portion 10 of the fitting. The sealing material 20 is forced against the plunger 17 and the metal washer 21 forces the flexible washer 22 in sealing engagement with the wall 14 and also causes the sealing material 20 to be forced outwardly between the lower face of the plunger 15 and the metal washer 21.

It will be evident from the foregoing description that I have provided a novel flow control fitting with venting means below an apertured wall for simulating the operation of a thin plate orifice, and I further provide novel means for maintaining the flow of solid material, such as food particles and the like, in a fluid line without stoppage by the provision of a plunger which is operated externally of the fitting and requires no interruption of flow of the fluid to the fitting and it utilizes the flow of the fluid to assist in the cleaning of the fitting and clearing it of the solid matter.

Various changes may be made in the specific embodiment of my invention without departing from the spirit thereof, or from the scope of the appended claim.

What I claim is:

A flow control device comprising a cylindrical body having an outlet on one end thereof, a laterally extending inlet intermediate thereof, and a threaded recess in the end of said body opposite to said outlet; a comparatively thin plate wall having an orifice of predetermined size centrally thereof in said cylindrical body between said inlet and said outlet, said wall defining a chamber on the inlet and outlet sides thereof, an air vent extending laterally from said body immediately below said thin plate wall therein defining a thin plate orifice for the control of fluid passing through said fitting, a threaded apertured plug for engagement with the threaded recess in the end of said body and a reciprocating plunger extending through said apertured plug and adapted to extend through said orifice in said thin plate.

WELLINGTON L. RAMSEY.

REFERENCES CITED

The following references are of record in the file of this patent:

UNITED STATES PATENTS

| Number | Name | Date |
| --- | --- | --- |
| 170,808 | Blake | Dec. 7, 1875 |
| 528,459 | Belivean | Oct. 30, 1894 |
| 998,232 | Donholt | July 18, 1911 |
| 1,937,246 | Reedy | Nov. 28, 1933 |
| 2,345,787 | Boosey | Apr. 4, 1944 |